(12) United States Patent
Sun

(10) Patent No.: US 12,014,019 B2
(45) Date of Patent: Jun. 18, 2024

(54) DISPLAY METHOD, APPARATUS AND COMPUTER READABLE STORAGE MEDIUM

(71) Applicants: BEIJING WODONG TIANJUN INFORMATION TECHNOLOGY CO., LTD., Beijing (CN); BEIJING JINGDONG CENTURY TRADING CO., LTD., Beijing (CN)

(72) Inventor: Guodong Sun, Beijing (CN)

(73) Assignees: BEIJING WODONG TIANJUN INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 0 days.

(21) Appl. No.: 17/786,385

(22) PCT Filed: Sep. 23, 2020

(86) PCT No.: PCT/CN2020/117096
§ 371 (c)(1),
(2) Date: Jun. 16, 2022

(87) PCT Pub. No.: WO2021/120756
PCT Pub. Date: Jun. 24, 2021

(65) Prior Publication Data
US 2023/0008653 A1    Jan. 12, 2023

(30) Foreign Application Priority Data
Dec. 18, 2019  (CN) .......................... 201911309438.7

(51) Int. Cl.
*G06F 3/048* (2013.01)
*G06F 3/0481* (2022.01)
(Continued)

(52) U.S. Cl.
CPC ........ *G06F 3/0481* (2013.01); *G06F 3/04847* (2013.01); *G06F 3/165* (2013.01);
(Continued)

(58) Field of Classification Search
CPC .... G06F 3/0481; G06F 3/04847; G06F 3/165; G06F 2203/04804; G06F 2203/04806
See application file for complete search history.

(56) References Cited

U.S. PATENT DOCUMENTS 6,981,227 B1    12/2005  Taylor
8,351,989 B2 *   1/2013  Ahn ...................... G06F 3/0489
                                                              715/767
(Continued)

FOREIGN PATENT DOCUMENTS

CN    101739202 A    6/2010
CN    102510425 A    6/2012
(Continued)

OTHER PUBLICATIONS

"First Office Action and English language translation", CN Application No. 201911309438.7, May 14, 2021, 16 pp.
(Continued)

*Primary Examiner* — David Phantana-angkool
(74) *Attorney, Agent, or Firm* — Myers Bigel, P.A.

(57) ABSTRACT

This disclosure relates to a display method, apparatus, and computer-readable storage medium, and relates to the field of computer technologies. The display method of this disclosure includes: in response to a user selecting an object to be displayed, acquiring data of the object to be displayed; and according to the data of the object to be displayed, displaying the object to be displayed through a page newly added in an application, and simultaneously displaying an original page of the application in a perspective manner, wherein at least one of the newly added page or the original (Continued)

```
in response to a user selecting an object to be          S102
displayed, acquiring data of the object to be
              displayed displaying the object to be displayed through a page     S104
newly added in an application, and simultaneously
displaying an original page of the application in a
              perspective manner
``` page is configured to be in a corresponding preset transparency, so that the object to be displayed and the original page are displayed simultaneously.

18 Claims, 3 Drawing Sheets

(51) Int. Cl.
 *G06F 3/04847* (2022.01)
 *G06F 3/16* (2006.01)
(52) U.S. Cl.
 CPC .............. *G06F 2203/04804* (2013.01); *G06F 2203/04806* (2013.01)

(56) References Cited

U.S. PATENT DOCUMENTS

| | | | |
|---|---|---|---|
| 9,213,538 B1* | 12/2015 | Ladd ....................... G06F 21/10 | |
| 9,760,256 B1* | 9/2017 | Weatherall ............ G06F 21/554 | |
| 10,607,377 B2* | 3/2020 | Furches Cranfill ......................... G06F 3/04845 | |
| 10,747,386 B2* | 8/2020 | Kocharlakota ....... G06F 3/0481 | |
| 10,768,789 B1* | 9/2020 | Devadoss ............. G06F 3/0485 | |
| 11,435,876 B1* | 9/2022 | Kakati .................... G06F 9/451 | |
| 11,847,680 B1* | 12/2023 | Victor ................ G06Q 30/0603 | |
| 11,868,586 B2* | 1/2024 | Ning ....................... G06F 9/451 | |
| 2006/0059432 A1* | 3/2006 | Bells ........................ G09G 5/14 715/768 | |
| 2007/0182721 A1* | 8/2007 | Watanabe ........... G06F 3/04886 345/173 | |
| 2008/0207188 A1* | 8/2008 | Ahn .................... G06F 3/04883 455/418 | |
| 2009/0150824 A1* | 6/2009 | Furuichi ............... G06F 3/0481 715/803 | |
| 2010/0332989 A1* | 12/2010 | Havivi .................... G06F 9/451 718/1 | |
| 2014/0237420 A1* | 8/2014 | Song ................... G06F 3/04817 715/788 | |
| 2016/0154536 A1* | 6/2016 | Kim ........................ G06F 9/451 715/768 | |
| 2017/0308261 A1* | 10/2017 | Lee .................... H04N 21/4438 | |
| 2018/0024702 A1* | 1/2018 | Noel ..................... G06F 3/0484 715/771 | |
| 2018/0052571 A1* | 2/2018 | Seol ....................... G06F 3/0488 | |
| 2018/0316939 A1* | 11/2018 | Todd ................ H04N 21/21805 | |
| 2019/0073101 A1* | 3/2019 | Li .......................... G06F 3/0483 | |
| 2019/0188246 A1* | 6/2019 | Pang ..................... G06F 40/106 | |
| 2019/0235748 A1* | 8/2019 | Seol .................... G06F 3/04815 | |
| 2020/0028961 A1* | 1/2020 | Wang ..................... G06F 9/451 | |
| 2020/0202584 A1* | 6/2020 | Furches Cranfill ... G06T 11/001 | |
| 2021/0344991 A1* | 11/2021 | Todd .................. H04N 21/4438 | |
| 2022/0253807 A1* | 8/2022 | Woodard ............. G06F 3/04845 | |
| 2023/0178228 A1* | 6/2023 | Chen ..................... G06Q 30/018 705/2 | |

FOREIGN PATENT DOCUMENTS

| | | |
|---|---|---|
| CN | 103488389 A | 1/2014 |
| CN | 103885678 A | 6/2014 |
| CN | 103970422 A | 8/2014 |
| CN | 106303653 A | 1/2017 |
| CN | 106648337 A | 5/2017 |
| CN | 109151581 A | 1/2019 |
| CN | 110186475 A | 8/2019 |
| KR | 20150128090 A | 11/2015 |

OTHER PUBLICATIONS

"International Search Report and Written Opinion of the International Searching Authority with English language translation", International Application No. PCT/CN2020/117096, Jan. 4, 2021, 12 pp.

"Second Office Action and English language translation", CN Application No. 201911309438.7, Dec. 2, 2021, 9 pp.

"Communication with Supplementary European Search Report", EP Application No. 20901086.7, Nov. 3, 2023, 7 pp.

* cited by examiner

DISPLAY METHOD, APPARATUS AND COMPUTER READABLE STORAGE MEDIUM

CROSS-REFERENCE TO RELATED APPLICATIONS

The present application is a U.S. National Stage Application under 35 U.S.C. § 371 of International Patent Application No. PCT/CN2020/117096, filed on Sep. 23, 2020, which is based on and claims the priority to Chinese patent application No. 201911309438.7 filed on Dec. 18, 2019, the disclosures of both of which are hereby incorporated as a whole into the present application.

TECHNICAL FIELD

This disclosure relates to the field of computer technologies, and particularly, to a display method, apparatus, and computer-readable storage medium.

BACKGROUND

With the development of Internet technologies, mobile phones have become indispensable devices in people's lives. People do shopping, socializing, reading, shooting, playing videos and music, and the like through the mobile phones, and different functions are packaged into various APPs (Applications) and configured in the mobile phones.

As people's pace of life becomes faster and faster, very often, in order to save time, it is needed to be able to take a look at other less energy-consuming matters while viewing the APPs. For example, while a child's mother opens a shopping APP for shopping, she also hopes to watch the child through a camera. For another example, while an object in an APP is browsed, watching a TV show and the like by using the mobile phone is not influenced.

SUMMARY

According to some embodiments of the present disclosure, there is provided a display method, including: in response to a user selecting an object to be displayed, acquiring data of the object to be displayed; and according to the data of the object to be displayed, displaying the object to be displayed through a page newly added in an application, and simultaneously displaying an original page of the application in a perspective manner, wherein at least one of the newly added page or the original page is configured to be in a corresponding preset transparency, so that the object to be displayed and the original page are displayed simultaneously.

In some embodiments, in the case that the newly added page is configured as a top-layer page of the application, the newly added page is configured to be in a first preset transparency, and the original page maintains an original configuration; or in the case that the newly added page is configured as a bottom-layer page of the application, the original page in the application is configured to be in second preset transparency.

In some embodiments, in the case that the newly added page is configured as the top-layer page of the application, the newly added page is configured to disable responses to all operation events, to make an operation of the user acts on the original page.

In some embodiments, the method further includes: receiving the operation of the user on the newly added page through a newly added control window interface; and according to the operation of the user on the newly added page, adjusting a configuration parameter of the newly added page.

In some embodiments, the according to operation of the user on the newly added page, adjusting a configuration parameter of the newly added page includes: in response to receiving a first operation of the user on the newly added page, adjusting the transparency of the newly added page; or in response to receiving a second operation of the user on the newly added page, adjusting sound of the object to be displayed, the object to be displayed including a video.

In some embodiments, the method further comprises: receiving the operation of the user through the displayed original page; and transferring an action parameter corresponding to the operation to the newly added page, and adjusting the configuration parameter of the newly added page according to the action parameter corresponding to the operation.

In some embodiments, the transferring an action parameter corresponding to the operation to the newly added page, and adjusting the configuration parameter of the newly added page according to the action parameter corresponding to the operation includes: in the case that the operation is a third operation, transferring an action parameter corresponding to the third operation to the newly added page, and adjusting the transparency of the newly added page according to the action parameter corresponding to the third operation; or in the case that the operation is a fourth operation, transferring an action parameter corresponding to the fourth operation to the newly added page, and adjusting the sound of the object to be displayed according to the action parameter corresponding to the fourth operation, the object to be displayed including: a video.

In some embodiments, in the case that the newly added page is configured as the top-layer page of the application, the newly added page is configured to enable a response to a preset operation event and disable a response to other operation event, to make the preset operation event act on the newly added page and the other operation event act on the original page.

In some embodiments, the method further includes: monitoring whether the operation of the user triggers the preset operation event; and in response to the operation of the user triggering the preset operation event, adjusting the configuration parameter of the newly added page according to the preset operation event.

In some embodiments, the in response to the operation of the user triggering the preset operation event, adjusting the configuration parameter of the newly added page according to the preset operation event includes: in response to the operation of the user triggering a first preset operation event, adjusting the transparency of the newly added page; or in response to the operation of the user triggering a second preset operation event, adjusting the sound of the object to be displayed, the object to be displayed including: a video.

In some embodiments, the method further includes: in response to the user triggering a closing function of the object to be displayed, closing the newly added page.

In some embodiments, the method further includes: in response to the user triggering a zooming-out function of the object to be displayed, changing the newly added page into a floating window in a preset size, and displaying the object to be displayed at a preset position.

According to other embodiments of the present disclosure, there is provided a display apparatus, including: an acquisition module configured to acquire data of an object to be displayed in response to a user selecting the object to be displayed; and a display module configured to display the object to be displayed through one page newly added in an application according to the data of the object to be displayed, and simultaneously display an original page of the application in a perspective manner, wherein at least one of the newly added page or the original page is configured to be in a corresponding preset transparency, so that the object to be displayed and the original page are displayed simultaneously.

In some embodiments, in the case that the newly added page is configured as a top-layer page of the application, the newly added page is configured to be in a first preset transparency, and the original page maintains an original configuration; or in the case that the newly added page is configured as a bottom-layer page of the application, the original page in the application is configured to be in second preset transparency.

In some embodiments, in the case that the newly added page is configured as the top-layer page of the application, the newly added page is configured to disable responses to all operation events, to make an operation of the user acts on the original page.

In some embodiments, the apparatus further includes: a first control module configured to receive the operation of the user on the newly added page through a newly added control window interface; and adjust a configuration parameter of the newly added page according to the operation of the user on the newly added page.

In some embodiments, the first control module is configured to, in response to receiving a first operation of the user on the newly added page, adjust the transparency of the newly added page; or in response to receiving a second operation of the user on the newly added page, adjust sound of the object to be displayed, wherein the object to be displayed includes: a video.

In some embodiments, the apparatus further includes: a second control module configured to receive the operation of the user through the displayed original page; and transfer an action parameter corresponding to the operation to the newly added page, and adjust the configuration parameter of the newly added page according to the action parameter corresponding to the operation.

In some embodiments, the second control module is configured to, in the case that the operation is a third operation, transfer an action parameter corresponding to the third operation to the newly added page, and adjust the transparency of the newly added page according to the action parameter corresponding to the third operation; or in the case that the operation is a fourth operation, transfer an action parameter corresponding to the fourth operation to the newly added page, and adjust the sound of the object to be displayed according to the action parameter corresponding to the fourth operation, wherein the object to be displayed includes: a video.

In some embodiments, in the case that the newly added page is configured as the top-layer page of the application, the newly added page is configured to enable a response to a preset operation event and disable a response to other operation event, to make the preset operation event act on the newly added page and the other operation event act on the original page.

In some embodiments, the apparatus further includes: a third control module configured to monitor whether the operation of the user triggers the preset operation event; and in response to the operation of the user triggering the preset operation event, adjust the configuration parameter of the newly added page according to the preset operation event.

In some embodiments, the third control module is configured to, in response to the operation of the user triggering a first preset operation event, adjust the transparency of the newly added page; or in response to the operation of the user triggering a second preset operation event, adjust the sound of the object to be displayed, wherein the object to be displayed includes: a video.

In some embodiments, the apparatus further includes: a closing function module configured to, in response to the user triggering a closing function of the object to be displayed, close the newly added page.

In some embodiments, the apparatus further includes: a zooming function module configured to, in response to the user triggering a zooming-out function of the object to be displayed, change the newly added page into a floating window in a preset size, and display the object to be displayed at a preset position.

According to still other embodiments of the present disclosure, there is provided a display apparatus, including: a processor; and a memory coupled to the processor, the memory being configured to store instructions which, when executed by the processor, cause the processor to perform the display method of any of the embodiments described above.

According to further embodiments of the present disclosure, there is provided a non-transitory computer-readable storage medium having thereon stored a computer program, wherein the program, when executed by a processor, implements steps of the display method of any of the embodiments described above.

Other features of the present disclosure and advantages thereof will become apparent from the following detailed description of exemplary embodiments thereof, which proceeds with reference to the accompanying drawings.

BRIEF DESCRIPTION OF THE DRAWINGS

In order to more clearly illustrate the embodiments of the present disclosure or the technical solutions in the prior art, the drawings used in the description of the embodiments or the prior art will be briefly described below, it is obvious that the drawings in the following description are only some embodiments of the present disclosure, and other drawings can be obtained by one of ordinary skill in the art without making creative efforts.

DETAILED DESCRIPTION

The technical solutions in the embodiments of the present disclosure will be described clearly and completely in conjunction with the drawings in the embodiments of the present disclosure, and it is obvious that the embodiments described are only some of the embodiments of the present disclosure, rather than all of the embodiments. The following description of at least one exemplary embodiment is merely illustrative in nature and is in no way intended to limit this disclosure, its application, or uses. All other embodiments, which can be derived by one of ordinary skill in the art from the embodiments disclosed herein without making any creative effort, shall fall within the protection scope of the present disclosure.

One technical problem to be solved in the present disclosure is: how to display another object while displaying an original page of an application.

In the present disclosure, there is provided a display method, which will be described below in conjunction with FIG. 1.

Figure 1:
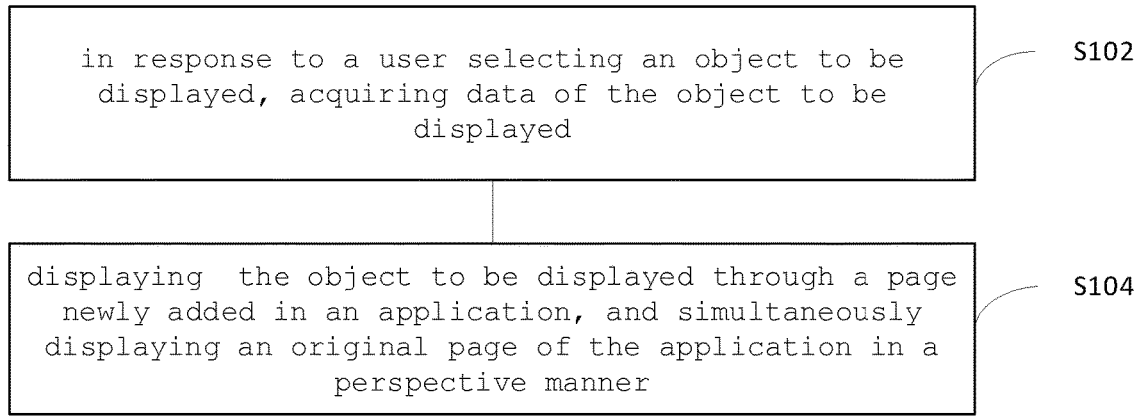
FIG. 1 illustrates a flow diagram of a display method according to some embodiments of the present disclosure.

FIG. 1 is a flow diagram of a display method according to some embodiments of the present disclosure. As shown in FIG. 1, the method of the embodiments includes: steps S102 to S104.

In step S102, in response to a user selecting an object to be displayed, data of the object to be displayed is acquired.

The object to be displayed can be an image or a video, etc. A function of newly adding a page can be provided in an application, and an operation of triggering, by the user, the function of newly adding a page is acquired, for example, by providing a button, or receiving a speech, or receiving a gesture instruction, among other things. In response to a triggering of the function of newly adding a page by the user, a page for acquiring the object to be displayed is displayed, for example, in a form of a pop-up window and the like. An identification of the object to be displayed inputted by the user is acquired through an input box provided in the page for acquiring the object to be displayed, or acquired in the form of speech or the like, or an object list can be displayed, the object to be displayed is selected from the object list by the user, so as to acquire the information on the object to be displayed selected by the user.

In the case that the object to be displayed is a video, the video can be a video shot by a camera of a user terminal, then in the page for acquiring the object to be displayed, a function of opening the camera can be provided, so that data of the video can be acquired through the camera. The video can also be a video already stored in the server, then an identification of the video inputted by the user or an identification (for example, address information or name, etc.) of a selected video can be acquired, and data of the video is acquired according to the identification of the video. An operating system in the terminal can call a built-in camera to shoot through an API (application program interface). By transferring the identification of the video to a player provided in the system, the data of the video can be acquired for video playing, which is not repeated herein.

In step S104, according to the data of the object to be displayed, the object to be displayed is displayed through one page newly added in the application, and an original page of the application is simultaneously displayed in a perspective manner.

After the data of the object to be displayed transferred by the camera or a network has been acquired, the transferred data of the object to be displayed can be received and the object to be displayed is displayed by using a full-screen View. The newly added page and the original page can be simultaneously displayed in a full-screen form, and because the mobile phone terminal is generally small, the two pages can be displayed more clearly by adopting the full-screen perspective display. One of the newly added page and the original page can be displayed through the other page. For example, at least one of the newly added page or the original page is configured to be in a corresponding preset transparency, so that the object to be displayed and the original page can be displayed simultaneously.

In some embodiments, in the case that the newly added page is configured as a top-layer page of the application, the newly added page is configured to be in first preset transparency, and the original page maintains an original configuration; or, in the case that the newly added page is configured as a bottom-layer page of the application, the original page is configured to be in second preset transparency. If the newly added page is configured as the top-layer page of the application, the lower-layer original page can be displayed in a perspective manner as long as the newly added page is configured as translucent. If the newly added page is configured as the bottom-layer page, the upper-layer original page needs to be configured as translucent, so that the object to be displayed can be displayed. Of course, the newly added page can also be configured as any layer page between the top-layer page and the bottom-layer page of the application, then each upper-layer original page of the newly added page can be configured to be in third preset transparency, the newly added page is configured to be in fourth preset transparency, and each lower-layer original page of the newly added page can maintain an original configuration.

Configuring the newly added page as the top-layer page, the original page may not be influenced, and in the case that there are many original pages, the configuration is simple, but the newly added page needs to be processed to avoid influencing the operation on the original page. Configuring the newly added page as the bottom-layer page, configuration of the original page needs to be changed, but the operation on the original page will not be influenced, the perspective effect is better when there are fewer original pages, and the display effect will be possibly influenced when there are more original pages.

In some embodiments, in the case where the newly added page is configured as the top-layer page of the application, the newly added page is configured to disable responses to all operation events, so that the operation of the user acts on the original page. In order to reduce the influence on the original page in the application, after the newly added page is configured as the top layer of the APP, it can be set that the newly added layer cannot receive any operation of the user. For example, the user cannot directly operate the newly added page by touching a display screen, and this effect can be achieved by calling a related method in the system API. For example, in an iOS system, the effect of that the newly added page does not accept the operation of the user can be achieved by adopting the following way: self.view.userInteractionEnabled=NO. If the user wants to operate the newly added page, a control window interface can be added or the operation can be transferred from the original page to the newly added page, which will be described in the following embodiments.

In other embodiments, in the case that the newly added page is configured as the top-layer page of the application, the newly added page is configured to enable a response to one or more preset operation events and disable a response to other operation events, so that the one or more preset operation events act on the newly added page and the other operation events act on the original page. The other operation events than the one or more preset operation events can be transferred to the lower-layer page of the newly added page, i.e., the original page. For example, a preset operation event corresponding to a preset touch gesture of the user can directly act on the newly added page, and other operation events corresponding to other touch gestures can act on the original page. For example, the effect can be achieved by calling a related method in the system API. For example, in the iOS system, it can be determined by a monitoring function whether the operation of the user on the newly added page triggers the preset operation event.

In the above embodiments, in response to the user selecting the object to be displayed, the data of the object to be displayed is acquired; and the object to be displayed is displayed through one newly added page in the application, and the original page of the application is simultaneously displayed in the perspective manner. Since at least one of the newly added page or the original page of the application is configured to be in the preset transparency, one of the newly added page and the original page can be displayed through the other page, to achieve the effect of simultaneously displaying the two pages and facilitate the use by the user, and the user can simultaneously view the original page of the application and the object to be displayed, to improve the browsing efficiency and the user experience.

In the case that the newly added page is configured as the top-layer page and disables the responses to all operation events, or the newly added page is configured as the bottom-layer page or an intermediate-layer page which cannot directly receive the operation, a control window interface can be configured to achieve the control of the newly added page by the user. In some embodiments, through a newly added control window interface, an operation of the user on the newly added page is received; and according to the operation of the user on the newly added page, a configuration parameter of the newly added page is adjusted. A display method according to other embodiments of the present disclosure will be described below in conjunction with FIG. 2.

Figure 2:
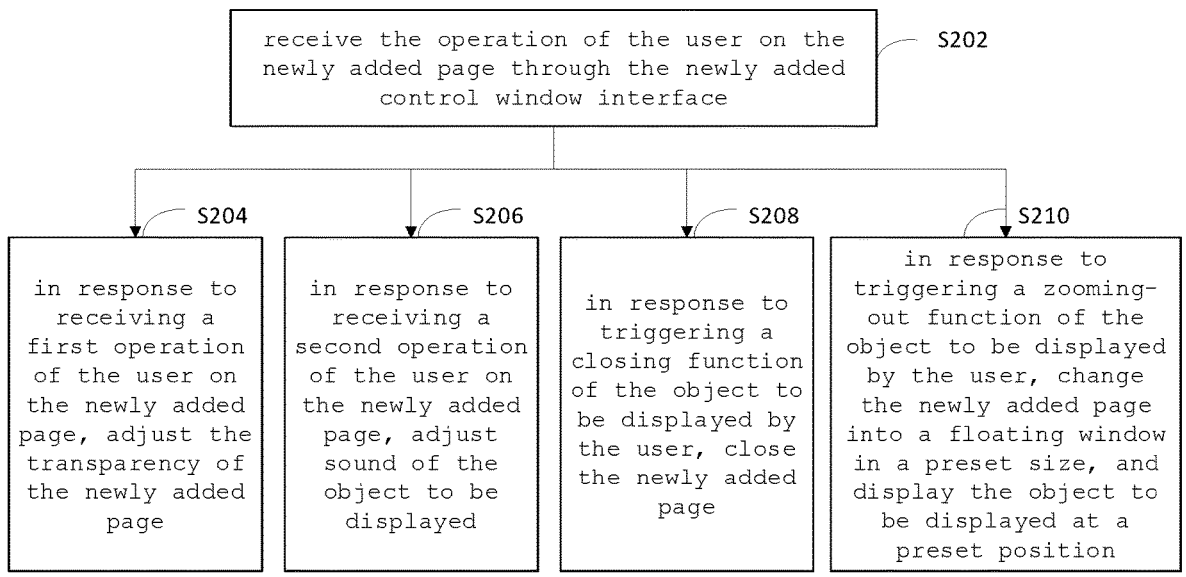
FIG. 2 illustrates a flow diagram of a display method according to other embodiments of the disclosure.

FIG. 2 is a flow diagram of a display method according to other embodiments of the present disclosure. As shown in FIG. 2, the method of the embodiments includes: steps S202 to S210.

In step S202, the operation of the user on the newly added page is received through the newly added control window interface.

In the case that the newly added page is configured as the top-layer page of the application, the newly added page is configured to disable the responses to all the operation events, and therefore, a newly added control window interface can be set to receive the operation of the user on the newly added page. For example, the control window interface can be displayed at one corner of the page and takes a preset size. One or more operation buttons and the like can be provided in the control window interface. In the case that the newly added page is configured as the bottom-layer page or the intermediate-layer page, the operation of the user on the newly added page can also be received by providing the newly added control window interface. The operation of the user on the newly added page can also be received by receiving a speech-operated instruction instead of configuring the control window interface.

In step S204, in response to receiving a first operation of the user on the newly added page, the transparency of the newly added page is adjusted.

The user can adjust the transparency of the newly added page through the control window interface. In the case where the operation of the user can directly act on the original page, a control function can be provided in the original page to enable the user to adjust the transparency of the original page, or the transparency of the original page is adjusted by receiving a first touch gesture of the user on the original page.

In step S206, in response to receiving a second operation of the user on the newly added page, sound of the object to be displayed is adjusted.

In the case that the object to be displayed includes a video, the user can adjust the sound of the object to be displayed through the control window interface, and of course, another operation of the user can also be received, which is, for example, adjusting color, playing speed, brightness, etc. of the object to be displayed, and is pre-configured according to actual needs.

In step S208, in response to the user triggering a closing function of the object to be displayed, the newly added page is closed.

For example, a closing button can be provided in the control window interface, or triggering the closing function by the user can be received in the form of speech or the like in the case where there is no control window interface.

In step S210, in response to the user triggering a zooming-out function of the object to be displayed, the newly added page is changed into a floating window in a preset size, and the object to be displayed is displayed at a preset position.

The user can control a size of the newly added page. In the case that the newly added page is changed into a floating window, the configuration that the newly added page disables the responses to all the operation events can be released, so that the newly added page in the floating window state can receive the operation of the user.

The method of the above embodiments can implement the operation of the user on the newly added page without influencing the operation on the original page, which facilitates the use and improves the user experience.

Figure 3:
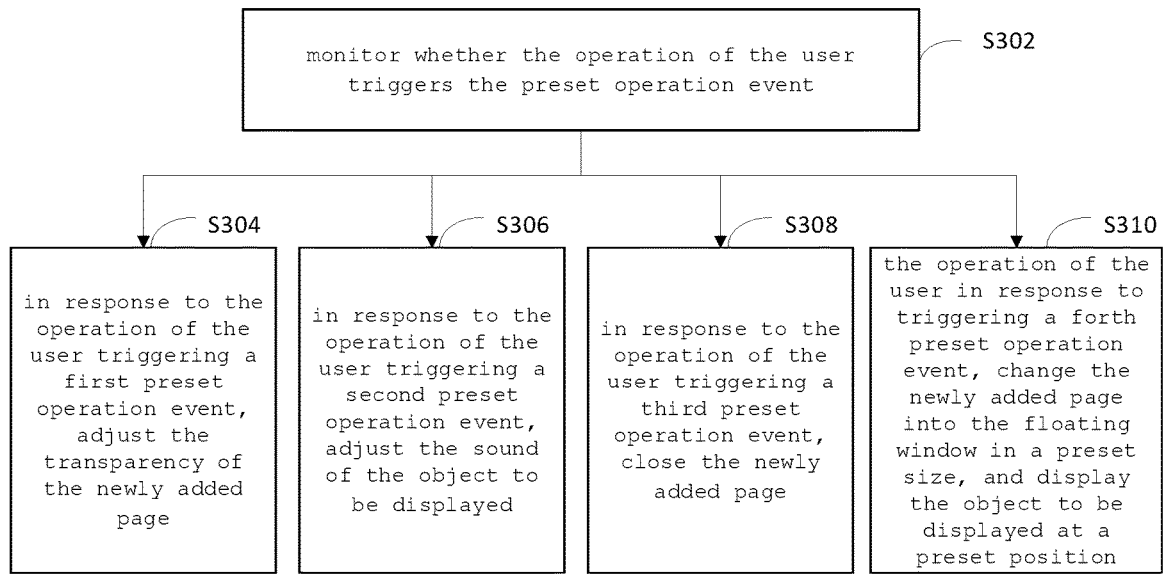
FIG. 3 illustrates a flow diagram of a display method according to still other embodiments of the disclosure.

The following describes in conjunction with FIG. 3, in the case that the newly added page is configured as the top-layer page of the application, enables the response to the preset operation event and disables responses to other operation events, how to implement the operation on the page. In some embodiments, it is monitored whether the operation of the user triggers the preset operation event; and in response to the operation of the user triggering the preset operation event, the configuration parameter of the newly added page is adjusted according to the preset operation event.

FIG. 3 is a flow diagram of a display method according to other embodiments of the present disclosure. As shown in FIG. 3, the method of the embodiments includes: steps S302 to S310.

In step S302, it is monitored whether the operation of the user triggers the preset operation event.

The user can operate by touching the display screen, by monitoring a gesture of the user on the display screen so as to monitor the operation of the user. A preset gesture corresponding to the preset operation event configured on the newly added page is different from an already configured gesture corresponding to the preset operation event configured on the original page. For example, swiping down three fingers can be configured as a preset gesture of performing an operation on the newly added page.

In step S304, in response to the operation of the user triggering a first preset operation event, the transparency of the newly added page is adjusted.

For example, swiping up three fingers at a top or left of the screen is to increase video-layer transparency and swiping down is to decrease the video-layer transparency.

In step S306, in response to the operation of the user triggering a second preset operation event, the sound of the object is adjusted.

For example, swiping up three fingers at a bottom or right of the screen is to increase the video sound and swiping down is to decrease the video sound.

In step S308, in response to the operation of the user triggering a third preset operation event, the newly added page is closed.

In step S310, in response to the operation of the user triggering a fourth preset operation event, the newly added page is changed into the floating window in the preset size, and the object to be displayed is displayed at the preset position.

The gesture of triggering the preset operation event by the user can be configured according to actual needs, and is not limited to the illustrated examples. If the gesture of the user cannot trigger the preset operation event, the operation event corresponding to the gesture of the user can be transferred to the original page.

In the above embodiments, the operation of the user on the newly added page can be implemented, without influencing the operation on the original page, which facilitates the use and improves the user experience.

In some embodiments, in the case that the newly added page disables all the operation events, it can be identified by the original page whether the operation of the user triggers the preset operation event, and if the preset operation event is triggered, the preset operation event is transferred to the newly added page to implement the operation on the newly added page. In some embodiments, the operation of the user is received through the displayed original page; an action parameter corresponding to the operation is transferred to the newly added page, and in the newly added page, the configuration parameter of the newly added page is adjusted according to the action parameter corresponding to the operation.

For example, the operation of the user is received through the displayed original page; in the case that the operation is a third operation, an action parameter corresponding to the third operation is transferred to the newly added page, and in the newly added page, the transparency of the newly added page is adjusted according to the action parameter corresponding to the third operation; or, in the case that the operation is a fourth operation, an action parameter corresponding to the fourth operation is transferred to the newly added page, and in the newly added page, the sound of the object to be displayed is adjusted according to the action parameter corresponding to the fourth operation, the object to be displayed includes a video. Similarly, the above method is also suitable for realizing functions such as closing, zooming of the object to be displayed.

In the present disclosure, there is further provided a display apparatus, which will be described below in conjunction with FIG. 4.

Figure 4:
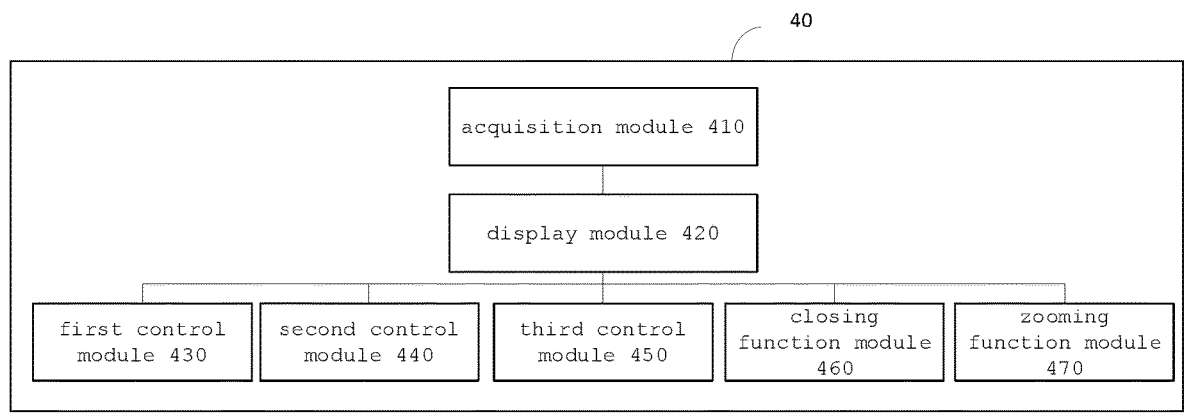
FIG. 4 illustrates a schematic structural diagram of a display apparatus according to some embodiments of the present disclosure.

FIG. 4 is a block diagram of a display apparatus according to some embodiments of the present disclosure. As shown in FIG. 4, the apparatus 40 of the embodiments includes: an acquisition module 410 and a display module 420.

The acquisition module 410 is configured to, in response to a user selecting an object to be displayed, acquire data of the object to be displayed.

The display module 420 is configured to, according to the data of the object to be displayed, display the object to be displayed through a page newly added in an application, and simultaneously display an original page of the application in a perspective manner, wherein at least one of the newly added page or the original page is configured to be in a corresponding preset transparency, so that the object to be displayed and the original page are displayed simultaneously.

In some embodiments, in the case that the newly added page is configured as a top-layer page of the application, the newly added page is configured to be in first preset transparency, and the original page maintains its original configuration; or, in the case that the newly added page is configured as a bottom-layer page of the application, the original page in the application is configured to be in second preset transparency.

In some embodiments, in the case that the newly added page is configured as the top-layer page of the application, the newly added page is configured to disable responses to all operation events, so that an operation of the user acts on the original page.

In some embodiments, the apparatus 40 further includes: a first control module 430 configured to receive an operation of the user on the newly added page through a newly added control window interface; and, according to the operation of the user on the newly added page, adjust a configuration parameter of the newly added page.

In some embodiments, the first control module 430 is configured to, in response to receiving a first operation of the user on the newly added page, adjust the transparency of the newly added page; and, in response to receiving a second operation of the user on the newly added page, adjust sound of the object to be displayed, wherein the object to be displayed includes: a video.

In some embodiments, the apparatus 40 further includes: a second control module 440 configured to receive the operation of the user through the displayed original page; and transfer an action parameter corresponding to the operation to the newly added page, and adjust the configuration parameter of the newly added page according to the action parameter corresponding to the operation in the newly added page.

In some embodiments, the second control module 440 is configured to, in the case that the operation is a third operation, transfer an action parameter corresponding to the third operation to the newly added page, and adjust the transparency of the newly added page according to the action parameter corresponding to the third operation in the newly added page; or, in the case that the operation is a fourth operation, transfer an action parameter corresponding to the fourth operation to the newly added page, and adjust the sound of the object to be displayed according to the action parameter corresponding to the fourth operation in the newly added page, wherein the object to be displayed includes: a video.

In some embodiments, in the case that the newly added page is configured as the top-layer page of the application, the newly added page is configured to enable a response to a preset operation event and disable a response to other operation events, so that the preset operation event acts on the newly added page and the other operation events act on the original page.

In some embodiments, the apparatus 40 further includes: a third control module 450 configured to monitor whether the operation of the user triggers the preset operation event; and, in response to triggering the preset operation event by the operation of the user, adjust the configuration parameter of the newly added page according to the preset operation event.

In some embodiments, the third control module 450 is configured to, in response to the operation of the user triggering a first preset operation event, adjust the transparency of the newly added page; or, in response to the operation of the user triggering a second preset operation event, adjust the sound of the object to be displayed, the object to be displayed includes: a video.

In some embodiments, the apparatus 40 further includes: a closing function module 460, configured to, in response to the user triggering a closing function of the object to be displayed, close the newly added page.

In some embodiments, the apparatus 40 further includes: a zooming function module 470, configured to, in response to the user triggering a zooming-out function of the object to be displayed, change the newly added page into a floating window in a preset size, and display the object to be displayed at a preset position.

The display apparatus in the embodiments of the present disclosure can be implemented by various computing devices or computer systems, which will be described below in conjunction with FIGS. 5 and 6.

Figure 5:
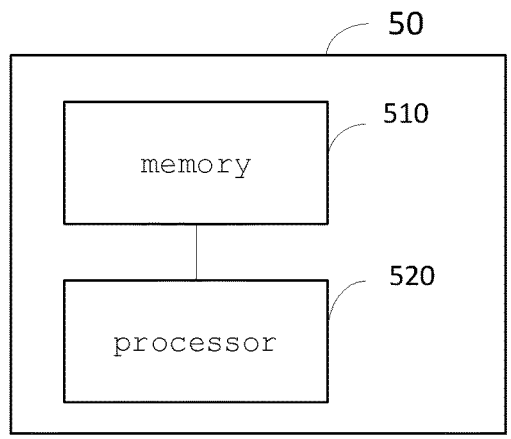
FIG. 5 illustrates a schematic structural diagram of a display apparatus according to other embodiments of the present disclosure.

FIG. 5 is a block diagram of a display apparatus according to some embodiments of the present disclosure. As shown in FIG. 5, the apparatus 50 of the embodiments includes: a memory 510 and a processor 520 coupled to the memory 510, the processor 520 being configured to perform, based on instructions stored in the memory 510, the display method in any of the embodiments of the present disclosure.

The memory 510 can include, for example, a system memory, fixed non-volatile storage medium, and the like. The system memory has thereon stored, for example, an operating system, an application program, a boot loader, a database, other programs, and the like.

Figure 6:
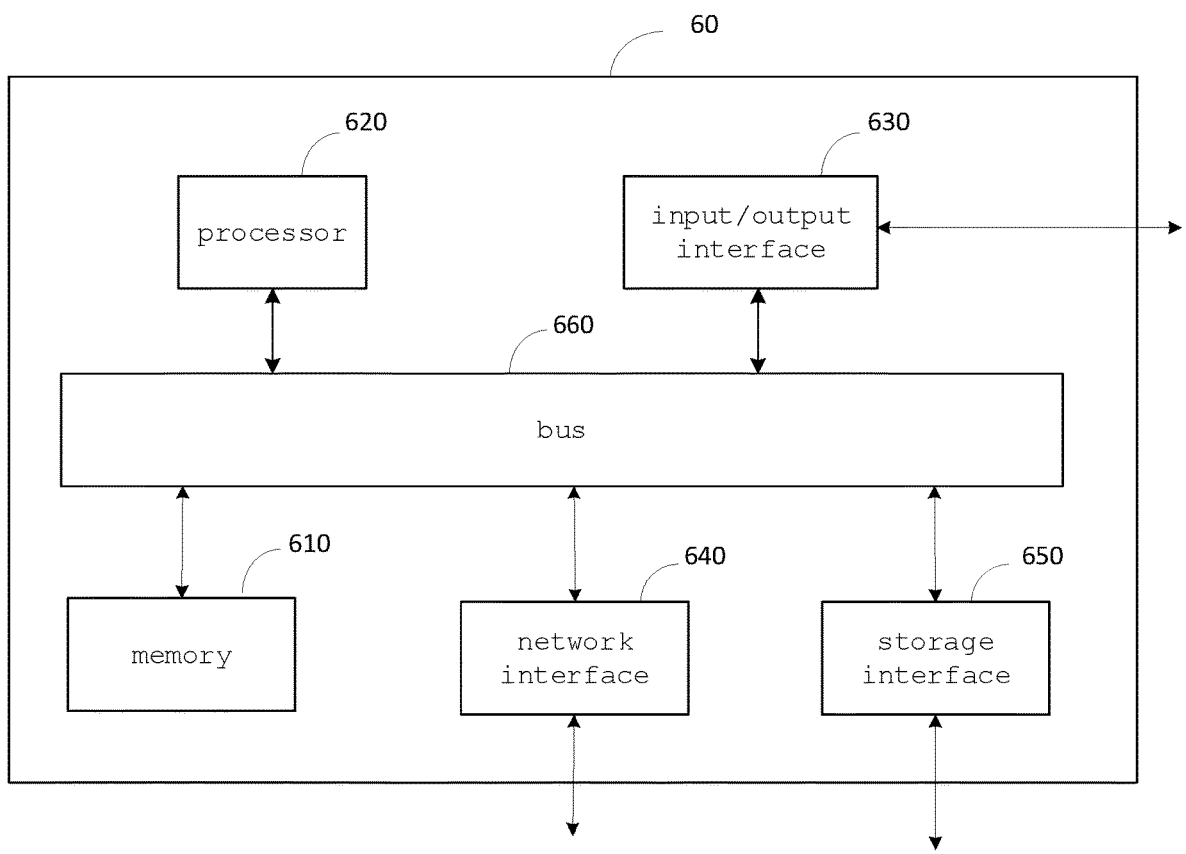
FIG. 6 illustrates a schematic structural diagram of a display apparatus according to still other embodiments of the present disclosure.

FIG. 6 is a block diagram of a display apparatus according to other embodiments of the present disclosure. As shown in FIG. 6, the apparatus 60 of the embodiment includes: a memory 610 and a processor 620, which are similar to the memory 510 and the processor 520, respectively. An input/output interface 630, network interface 640, storage interface 650, etc. can also be comprised. These interfaces 630, 640, 650 as well as the memory 610 and the processor 620 can be connected, for example, through a bus 660. The input/output interface 630 provides a connection interface for input/output devices such as a display, a mouse, a keyboard, a touch screen and the like. The network interface 640 provides a connection interface for various networking devices, which can be connected to, for example, a database server or a cloud storage server. The storage interface 650 provides a connection interface for external storage devices such as an SD card, a USB disk and the like.

It should be appreciated by those skilled in the art, the embodiments of the present disclosure can be provided as a method, system, or computer program product. Accordingly, the present disclosure can take a form of an entire hardware embodiment, an entire software embodiment or an embodiment combining software and hardware aspects. Furthermore, the present disclosure can take a form of a computer program product implemented on one or more computer-available non-transitory storage media (comprising, but not limited to, a disk memory, CD-ROM, optical memory, and the like) having therein contained computer-available program code.

The present disclosure is described with reference to flow diagrams and/or block diagrams of the method, apparatus (system), and computer program product according to the embodiments of the present disclosure. It should be understood that each flow and/or block of the flow diagrams and/or block diagrams, and a combination of flows and/or blocks in the flow diagrams and/or block diagrams, can be implemented by computer program instructions. These computer program instructions can be provided to a processor of a general-purpose computer, special-purpose computer, embedded processor, or other programmable data processing apparatuses to produce a machine, such that the instructions executed by the processor of the computer or other programmable data processing apparatuses create means for implementing a function specified in one or more flows of the flow diagrams and/or one or more or blocks of the block diagrams.

These computer program instructions can also be stored in a computer-readable memory that can guide the computer or other programmable data processing apparatuses to work in a specific way, such that the instructions stored in the computer-readable memory produce an article of manufacture comprising instruction means which implement a function specified in one or more flows of the flow diagrams and/or one or more or blocks of the block diagrams.

These computer program instructions can also be loaded onto the computer or other programmable data processing apparatuses, so that a series of operation steps are performed on the computer or other programmable apparatuses to produce computer-implemented processing, and therefore, the instructions executed on the computer or other programmable apparatuses provide steps for implementing functions specified in one or more flows of the flow diagrams and/or one or more or blocks of the block diagrams.

The above is only preferred embodiments of the present disclosure and is not intended to limit the present disclosure, and any modification, equivalent replacement, improvement, etc. made within the spirit and principle of the present disclosure should be contained within the protection scope of the present disclosure.

What is claimed is:

1. A display method, comprising:
   in response to a user selecting an object to be displayed, acquiring data of the object to be displayed; and
   according to the data of the object to be displayed, displaying the object to be displayed through a page newly added in an application, and simultaneously displaying an original page of the application in a perspective manner,
   wherein the newly added page is configured as a top-layer page of the application, the newly added page is configured to be in a first preset transparency, and the original page maintains an original configuration, the newly added page is configured to disable responses to all operation events, to make an operation of the user acts on the original page,
   the display method further comprising:
   receiving the operation of the user on the newly added page through a newly added control window interface; and
   according to the operation of the user on the newly added page, adjusting a configuration parameter of the newly added page, comprising:
   in response to receiving a first operation of the user on the newly added page, adjusting the transparency of the newly added page; or
   in response to receiving a second operation of the user on the newly added page, adjusting sound of the object to be displayed, the object to be displayed comprising: a video.

2. The display method according to claim 1, further comprising:
   receiving the operation of the user through the displayed original page; and transferring an action parameter corresponding to the operation to the newly added page, and adjusting the configuration parameter of the newly added page according to the action parameter corresponding to the operation.

3. The display method according to claim 2, wherein the transferring an action parameter corresponding to the operation to the newly added page, and adjusting the configuration parameter of the newly added page according to the action parameter corresponding to the operation comprises:

in the case that the operation is a third operation, transferring an action parameter corresponding to the third operation to the newly added page, and adjusting the transparency of the newly added page according to the action parameter corresponding to the third operation; or in the case that the operation is a fourth operation, transferring an action parameter corresponding to the fourth operation to the newly added page, and adjusting the sound of the object to be displayed according to the action parameter corresponding to the fourth operation, the object to be displayed comprising: a video.

4. The display method according to claim 1, further comprising:

in response to the user triggering a closing function of the object to be displayed, closing the newly added page.

5. The display method according to claim 1, further comprising:

in response to the user triggering a zooming-out function of the object to be displayed, changing the newly added page into a floating window in a preset size, and displaying the object to be displayed at a preset position.

6. A display apparatus, comprising:
a processor; and
a memory coupled to the processor, being configured to store instructions which, when executed by the processor, cause the processor to perform the display method according to claim 1.

7. A non-transitory computer-readable storage medium having thereon stored a computer program, wherein the program, when executed by a processor, implements steps of the display method according to claim 1.

8. A display method, comprising:
in response to a user selecting an object to be displayed, acquiring data of the object to be displayed; and
according to the data of the object to be displayed, displaying the object to be displayed through a page newly added in an application, and simultaneously displaying an original page of the application in a perspective manner,
wherein the newly added page is configured as a bottom-layer page of the application, the original page in the application is configured to be in second preset transparency, so that the object to be displayed and the original page are displayed simultaneously, in the case that the newly added page is configured as the top-layer page of the application, the newly added page is configured to enable a response to a preset operation event and disable a response to other operation event, to make the preset operation event act on the newly added page and the other operation event act on the original page;
the display method further comprising:
monitoring whether the operation of the user triggers the preset operation event; and in response to the operation of the user triggering the preset operation event, adjusting the configuration parameter of the newly added page according to the preset operation event.

9. The display method according to claim 8, wherein the in response to the operation of the user triggering the preset operation event, adjusting the configuration parameter of the newly added page according to the preset operation event comprises:

in response to the operation of the user triggering a first preset operation event, adjusting the transparency of the newly added page; or in response to the operation of the user triggering a second preset operation event, adjusting the sound of the object to be displayed, the object to be displayed comprising: a video.

10. A display apparatus, comprising:
a processor; and
a memory coupled to the processor, being configured to store instructions which, when executed by the processor, cause the processor to perform a display method according to claim 8.

11. A non-transitory computer-readable storage medium having thereon stored a computer program, wherein the program, when executed by a processor, implements steps of the display method according to claim 8.

12. A display method, comprising:
in response to a user selecting an object to be displayed, acquiring data of the object to be displayed; and
according to the data of the object to be displayed, displaying the object to be displayed through a page newly added in an application, and simultaneously displaying an original page of the application in a perspective manner,
wherein at least one of the newly added page or the original page is configured to be in a corresponding preset transparency, so that the object to be displayed and the original page are displayed simultaneously;
in response to the user triggering a zooming-out function of the object to be displayed, changing the newly added page into a floating window in a preset size, and displaying the object to be displayed at a preset position.

13. The display method according to claim 12, wherein:
in the case that the newly added page is configured as a top-layer page of the application, the newly added page is configured to be in a first preset transparency, and the original page maintains an original configuration;
in the case that the newly added page is configured as a top-layer page of the application, the newly added page is configured to be in a first preset transparency, and the original page maintains an original configuration.

14. The display method according to claim 13, wherein, in the case that the newly added page is configured as the top-layer page of the application, the newly added page is configured to disable responses to all operation events, to make an operation of the user acts on the original page.

15. The display method according to claim 14, further comprising:
receiving the operation of the user on the newly added page through a newly added control window interface; and
according to the operation of the user on the newly added page, adjusting a configuration parameter of the newly added page.

16. The display method according to claim 12, further comprising:
    in response to the user triggering a closing function of the object to be displayed, closing the newly added page.

17. A display apparatus, comprising:
    a processor; and
    a memory coupled to the processor, being configured to store instructions which, when executed by the processor, cause the processor to perform the display method according to claim 12.

18. A non-transitory computer-readable storage medium having thereon stored a computer program, wherein the program, when executed by a processor, implements steps of the display method according to claim 12.

* * * * *